United States Patent
Gandham et al.

(10) Patent No.: US 8,223,722 B2
(45) Date of Patent: Jul. 17, 2012

(54) PROVISIONAL HAND-OFF MECHANISM IN A HETEROGENEOUS MAC PROTOCOL FOR WIRELESS NETWORKS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 696 days.

(21) Appl. No.: 12/387,807

(22) Filed: May 7, 2009

(65) Prior Publication Data

US 2009/0310560 A1    Dec. 17, 2009

Related U.S. Application Data

(60) Provisional application No. 61/132,131, filed on Jun. 16, 2008.

(51) Int. Cl.
H04W 4/00    (2009.01)
H04W 36/00    (2009.01)

(52) U.S. Cl. ........................................ 370/332; 455/436

(58) Field of Classification Search .................. 370/328, 370/329, 331, 332, 340, 341; 455/436, 442, 455/443
See application file for complete search history.

(56) References Cited

U.S. PATENT DOCUMENTS

| | | | | |
|---|---|---|---|---|
| 7,003,047 | B2 * | 2/2006 | Bobier | 375/275 |
| 7,046,647 | B2 | 5/2006 | Oba et al. | |
| 8,059,623 | B2 * | 11/2011 | Gandham et al. | 370/338 |
| 8,111,648 | B2 * | 2/2012 | Gandham | 370/326 |
| 2006/0052108 | A1 | 3/2006 | Laroia et al. | |
| 2008/0070576 | A1 * | 3/2008 | Sanders et al. | 455/436 |
| 2009/0257414 | A1 * | 10/2009 | Gandham et al. | 370/338 |
| 2009/0268667 | A1 * | 10/2009 | Gandham et al. | 370/328 |

* cited by examiner

*Primary Examiner* — Kerri Rose
(74) *Attorney, Agent, or Firm* — Dennis L. Cook, Esq.

(57) ABSTRACT

This disclosure describes a provisional hand-off mechanism to transfer handsets between base stations for a MAC protocol that combines contention-free and contention-based MAC protocols for use in wireless VoIP systems with multiple base stations that reduces packet overhead thus allowing for transmission of high bit-rate data to multiple users over wired and wireless means.

2 Claims, 7 Drawing Sheets

State Transition Diagram for Provisional Handoff

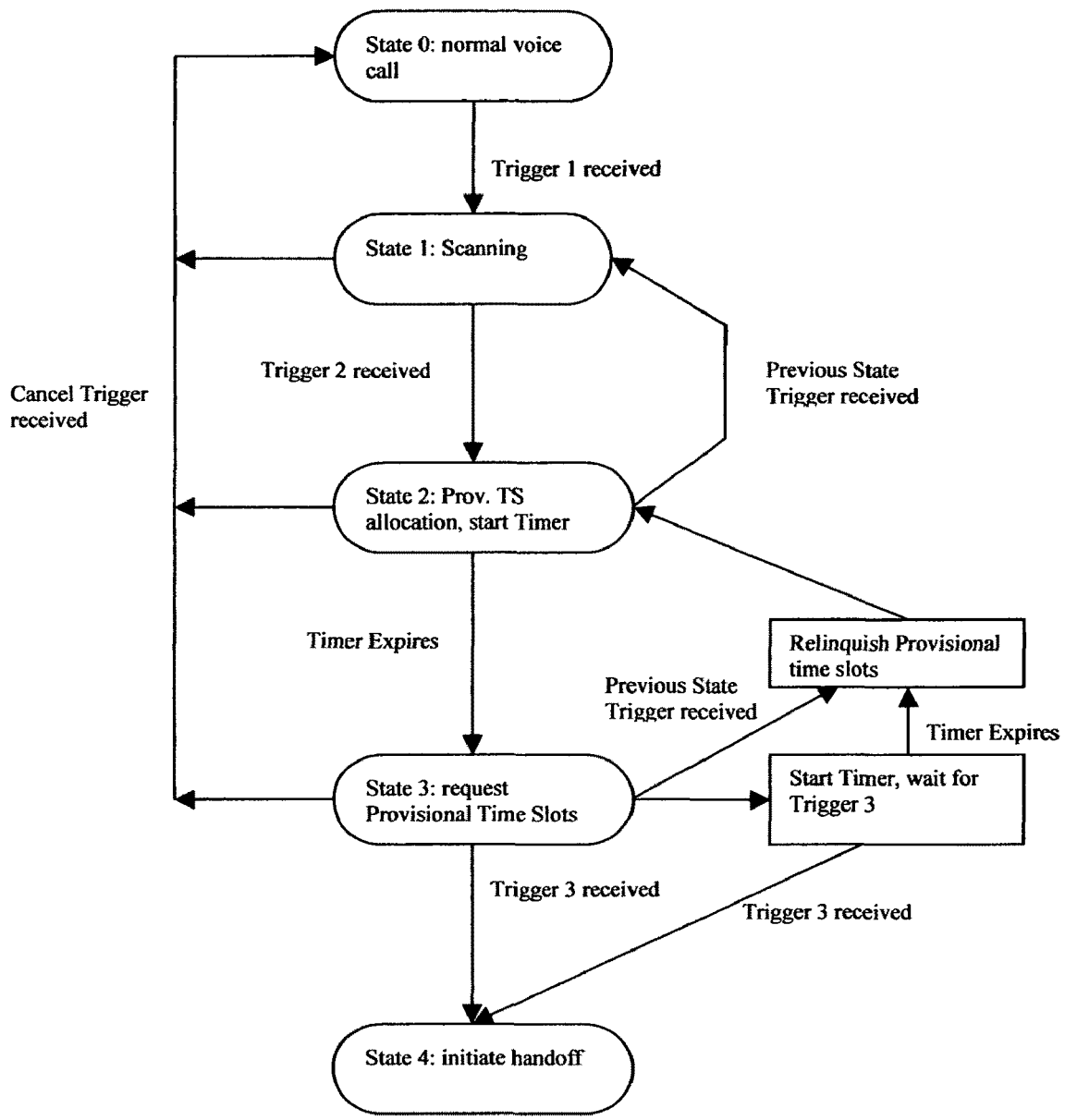
Figure 1. State Transition Diagram for Provisional Handoff

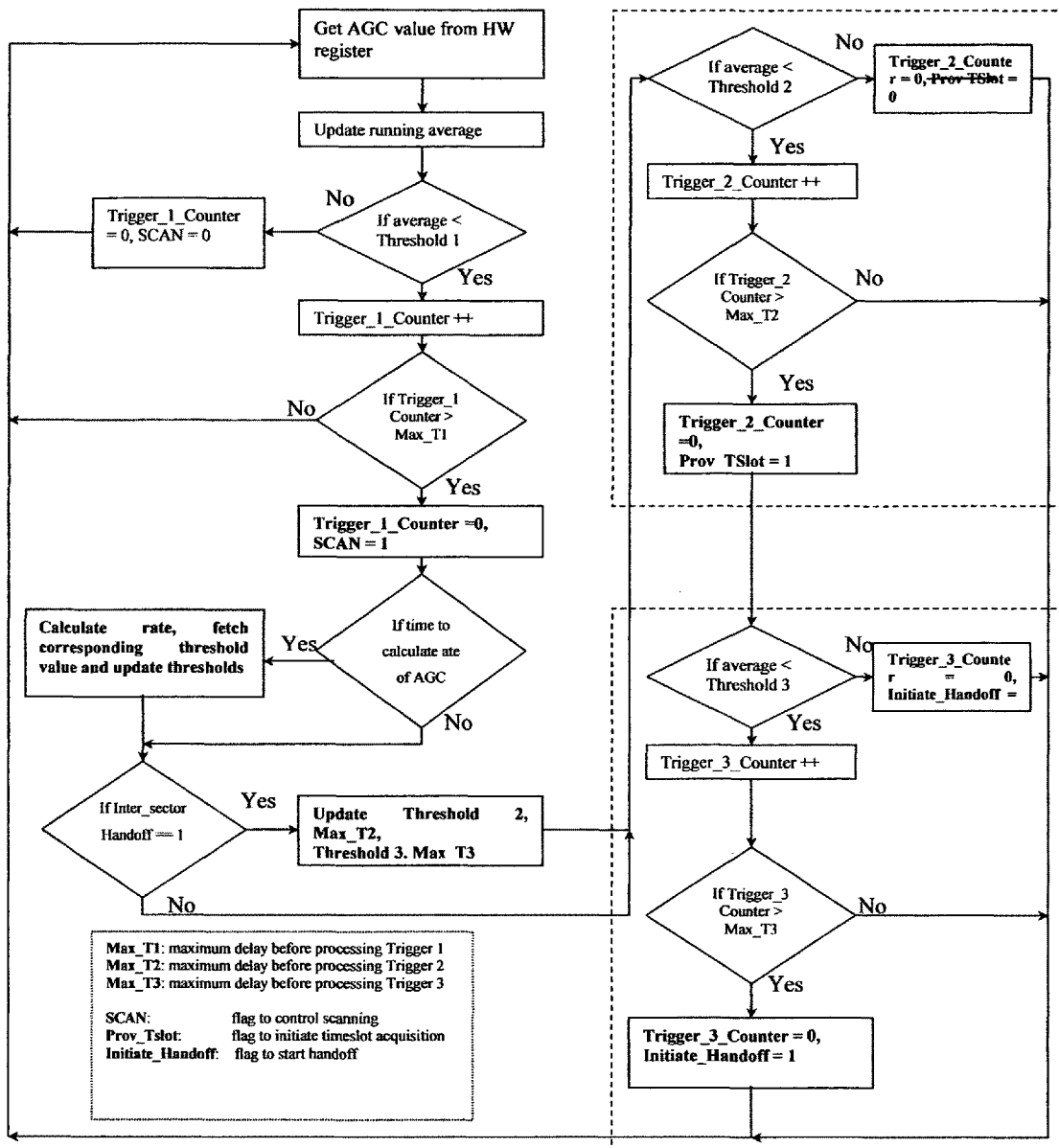
Figure 2. RSSI Monitoring Module execution flow

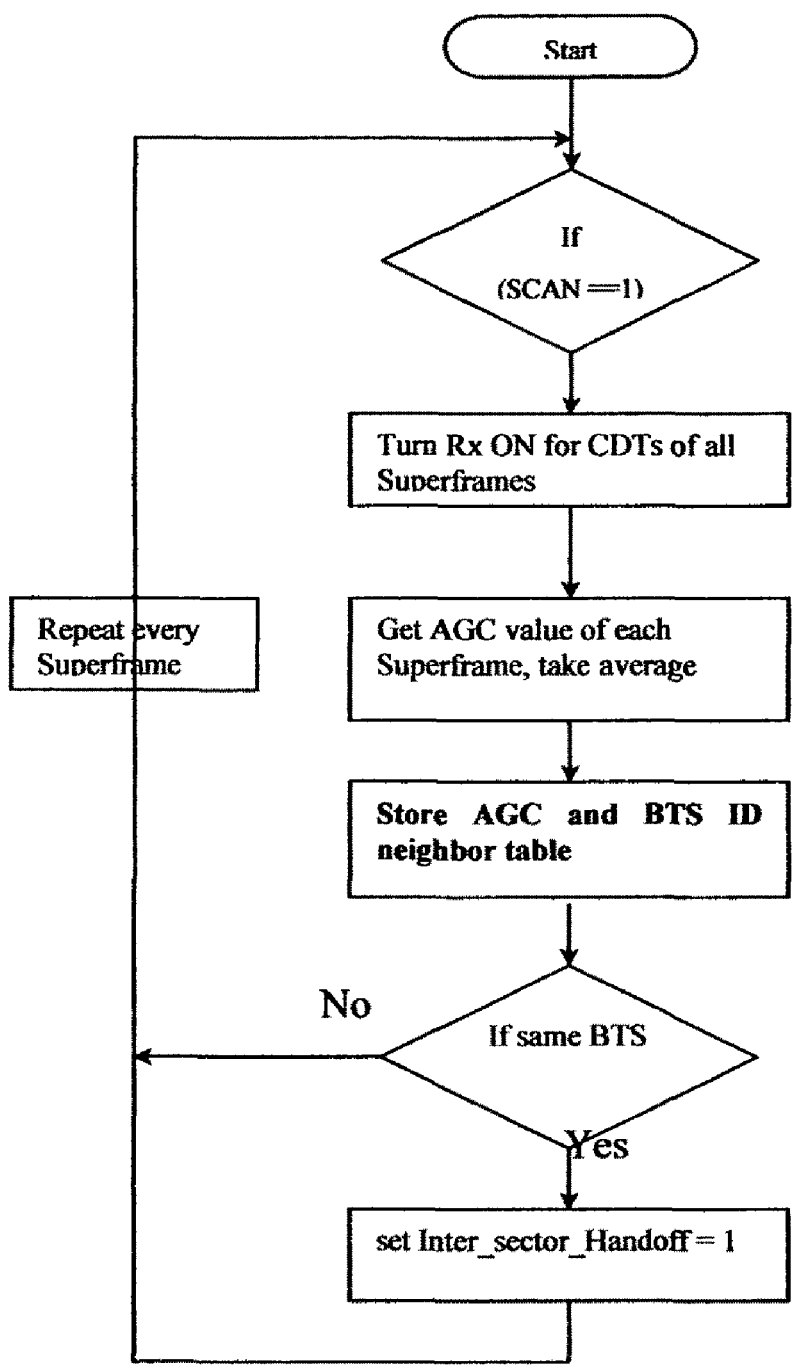
Figure 3. Scanning execution flow

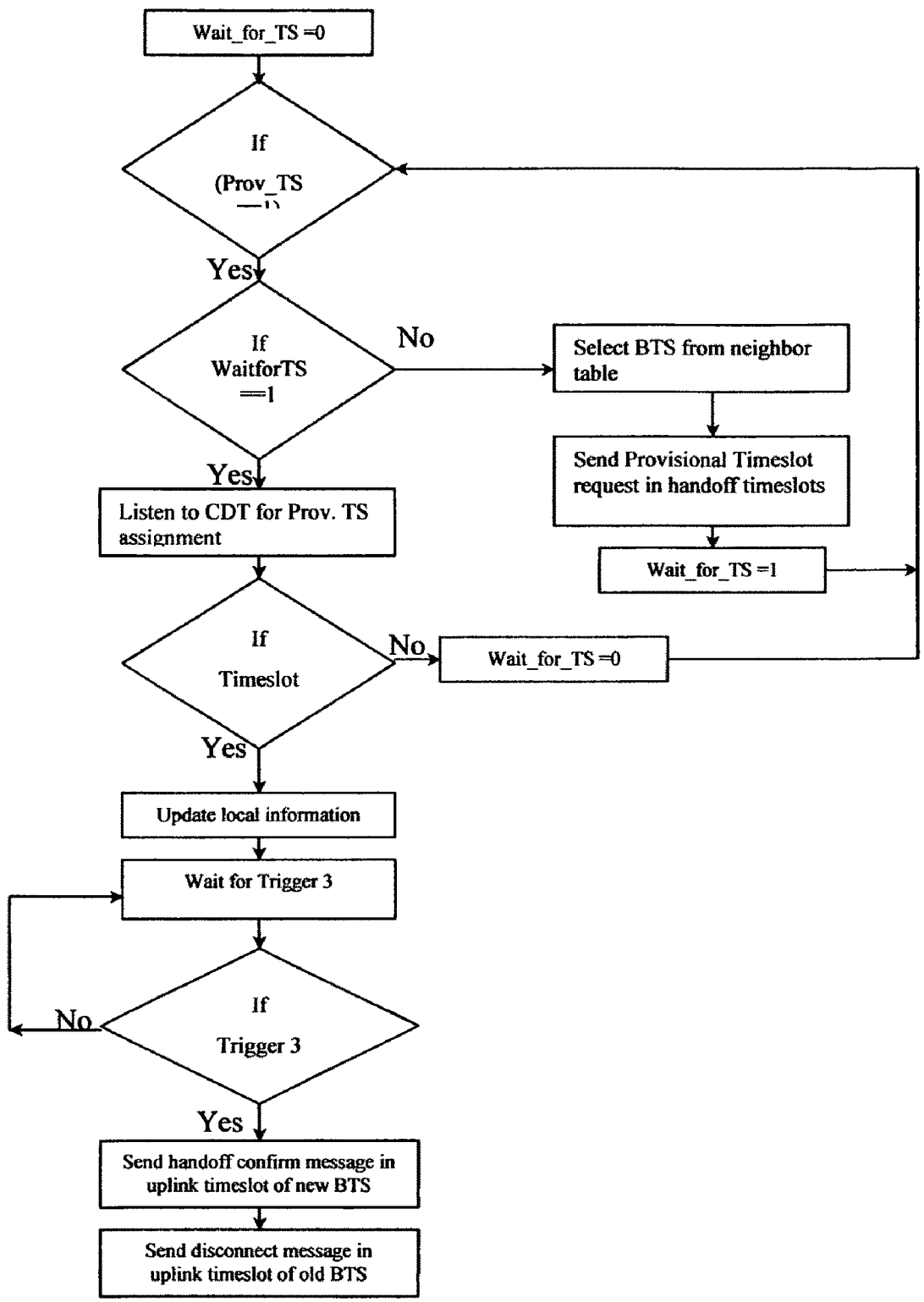
Figure 4. Provisional Timeslot Allocations

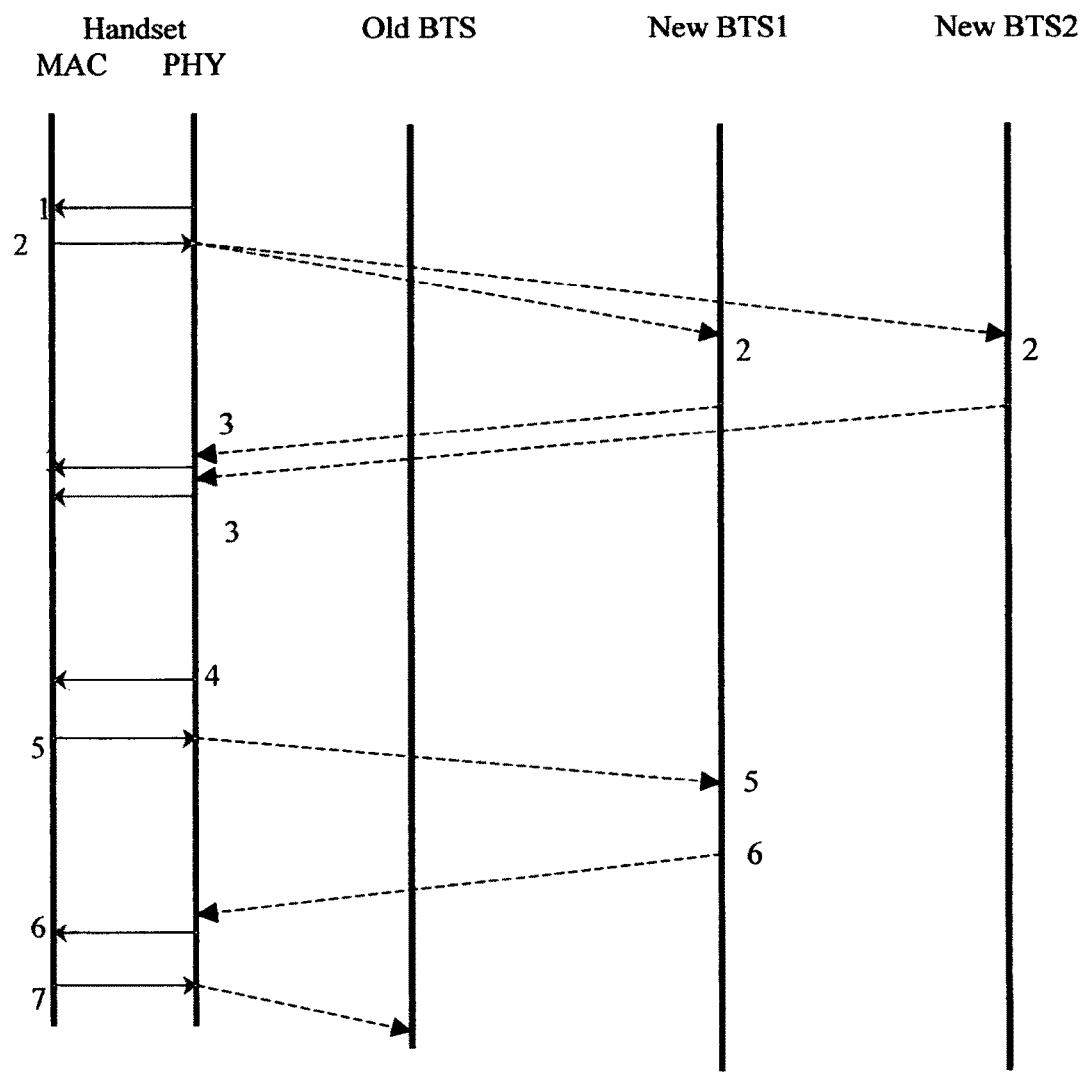
Figure 5. Message sequence timeline

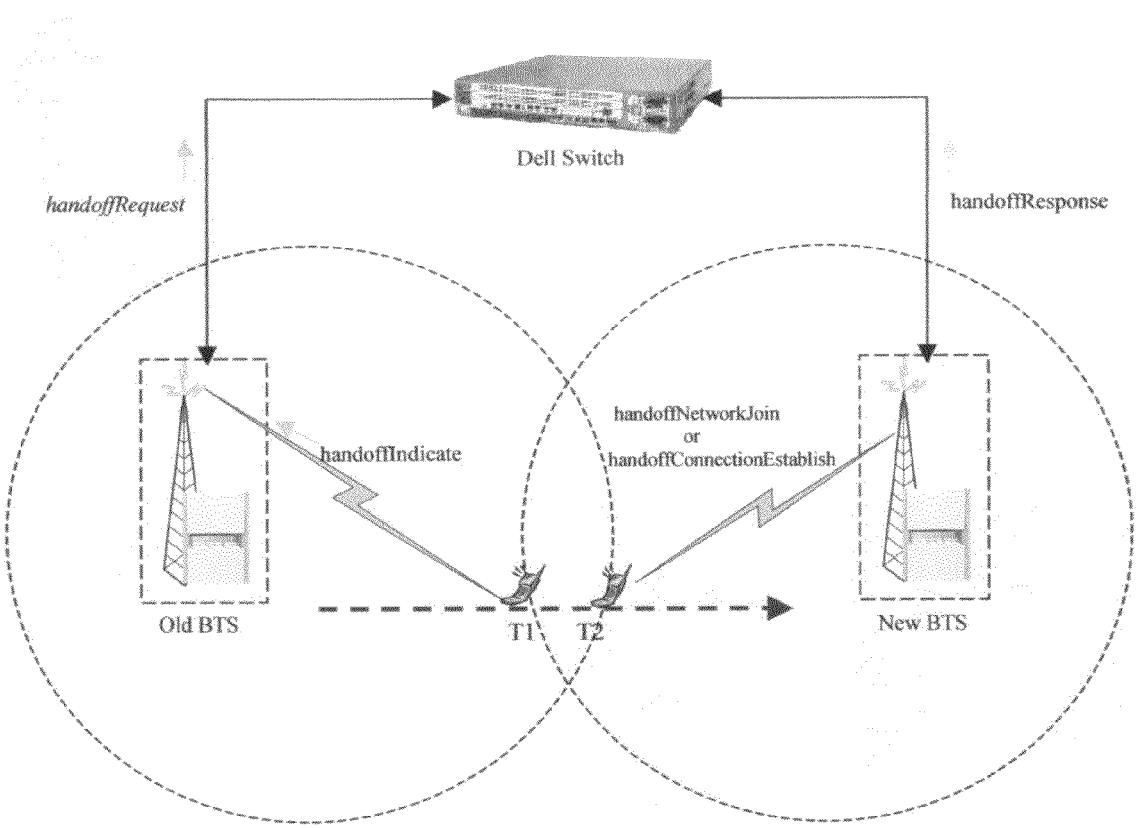
Figure 6. Handoff Process

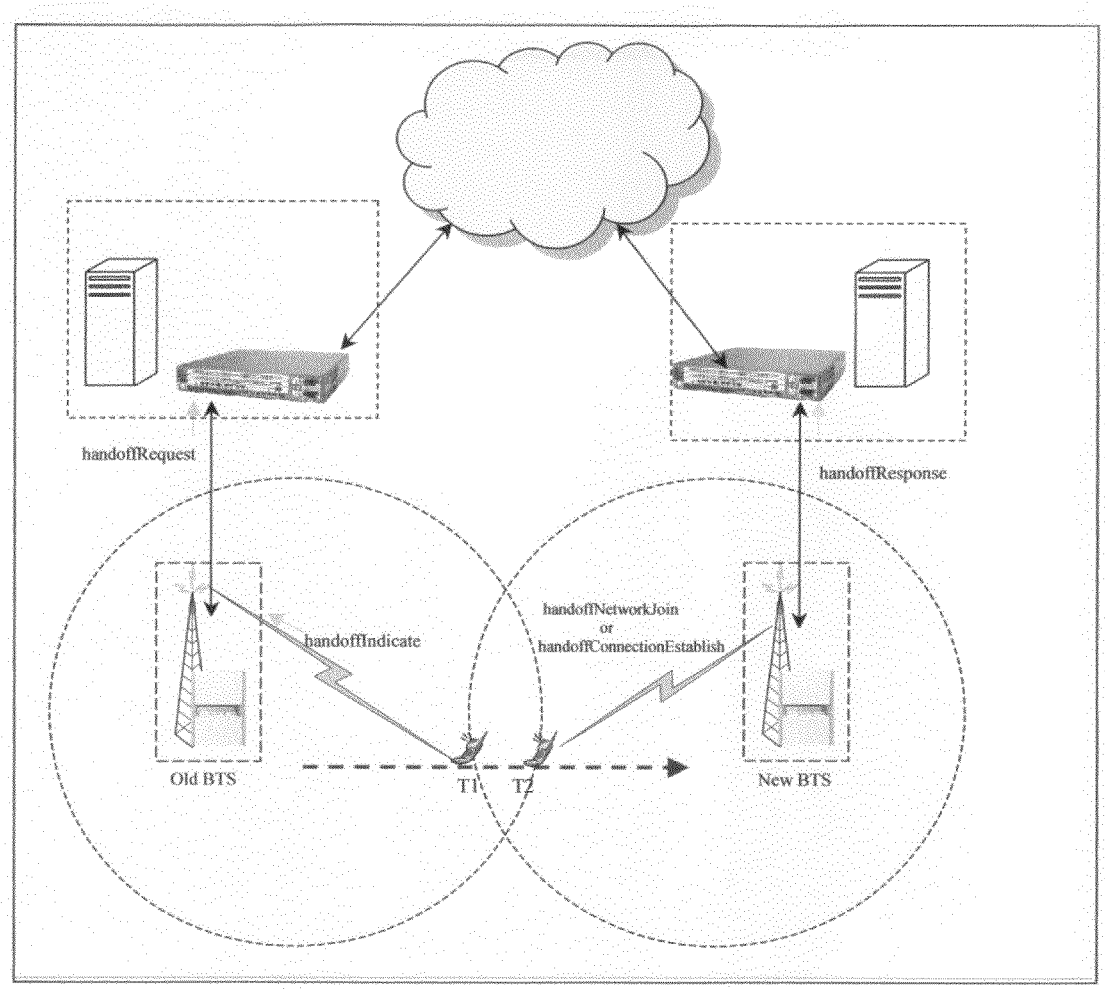
Figure 7. Inter-Dealer handoff

PROVISIONAL HAND-OFF MECHANISM IN A HETEROGENEOUS MAC PROTOCOL FOR WIRELESS NETWORKS

CROSS-REFERENCE TO RELATED APPLICATION

The present application claims the benefit of previously filed co-pending Provisional Patent Application Ser. No. 61/132,131.

FIELD OF THE INVENTION

This invention addresses the need to transport high bit-rate data and voice to multiple users over wired and wireless means. Specifically, this disclosure describes a provisional hand-off mechanism to transfer handsets between base stations for a MAC protocol that combines contention-free and contention-based MAC protocols for use in wireless VoIP systems with multiple base stations.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although the Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks was described in the pending patent application by one of the inventors of this application, "Heterogeneous MAC Protocol For Forwarding VoIP Traffic On Wireless Networks", U.S. Ser. No. 12/069,057, the contents of which are included herein. In that application guaranteed timeslots are assigned to forward VoIP packets, temporary timeslots are assigned to forward data packets and contention based access is used to exchange control messages. That application described the MAC protocol in the context of a single base station providing metropolitan wide mobile VoIP service. There is a need to deploy multiple base stations such that coverage areas of adjacent base stations overlap. If each of the base stations were to operate independently then multiple concurrent transmissions in adjacent cells might interfere with each other. Hence, in a patent application "Heterogeneous MAC Protocol for Multiple Base Stations in Wireless Networks", U.S. Ser. No. 12/380,698, by some of the inventors of this application the MAC protocol was modified to support multiple base stations. In "Improved Heterogeneous MAC Protocol for Multiple Base Stations in a Wireless Network", U.S. Ser. No. 61/123,888, the contents of which are included herein, an improvement was disclosed to eliminate additional interference points. This application describes a provisional handset hand-off method to transfer handsets between base stations for a MAC protocol that combines contention-free and contention-based MAC protocols for use in wireless VoIP systems with multiple base stations.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on any broad band wireless technologies like WiMax, WiBro, WiFi, 3GPP and HSDPA, or any other type of wired or wireless voice or data systems. This disclosure describes a provisional handset hand-off method to transfer handsets between base stations for a MAC protocol that combines contention-free and contention-based MAC protocols that reduces packet overhead for use in wireless VoIP systems with multiple base stations.

DESCRIPTION OF THE DRAWINGS

For a fuller understanding of the nature and objects of the invention, reference should be made to the accompanying drawings, in which:

FIG. 1 is a flow chart showing a state transition diagram;
FIG. 2 is a flow chart showing monitoring module execution flow;
FIG. 3 is a flow chart showing scanning execution flow;
FIG. 4 a flow chart showing provisional timeslot allocations flow;
FIG. 5 a chart showing message sequence timeline;
FIG. 6 a diagram showing the hand-off process; and,
FIG. 7 a diagram showing inter-dealer handoff.

DETAILED DESCRIPTION OF THE INVENTION

Although the provisional hand-off mechanism to transfer handsets between base stations method disclosed herein can be used in all wireless and wired networks the preferred embodiment is described below in the context of the new wireless physical layer technology developed by xG Technology Inc., referred to as xMAX, which enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations.

In the preferred embodiment VOIP-based cellular network xMAX handsets (or mobile nodes) are equipped with the complete VOIP stack. The xMAX base station is connected to the Internet through an Ethernet port. The mobile nodes communicate with the xMAX base station to reach a VOIP gateway. To enable communication between an xMAX handset and multiple xMAX base stations one needs a MAC (Medium Access Control) protocol that is optimized for VOIP traffic and has reduced overhead.

A heterogeneous MAC protocol proposed to support VOIP traffic in xMAX wireless networks has been discussed in previously filed patent applications U.S. Ser. Nos. 12/069,057; 12/070,057; 61/123,875; 61/123,888; and, 61/125,696 which are incorporated by reference into this disclosure. In this heterogeneous MAC protocol, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of using provisional hand-off as described herein can be used in other relevant systems.

When a handset running a heterogeneous MAC protocol is powered on it scans for base stations in its vicinity. On successfully identifying a base station the handset registers with the base station. The registration message is an indication to the base station that it needs to serve that particular handset. In a multi-base station deployment a handset might move from one base station to another. To provide seamless coverage one needs a mechanism to handle hand-offs. Handoff is the process by which a mobile handset breaks its connection with current Base Station (BTS) and establishes connection with another BTS without disrupting the voice session. It may be initiated due to movement of the mobile device, or due to drop in received signal strength caused by fading. In this invention disclosure we explain the hand-off mechanism of a heterogeneous MAC protocol. Note that the heterogeneous MAC protocol is used here as a reference protocol and similarly xMAX as a reference wireless network. The hand-off mechanism is applicable to any relevant system.

The decision to perform a handoff can be based on many factors; however, the most important factor is always the received signal strength from the competing base stations. All other factors such as Bit Error Rate, available capacity etc. play a secondary role in this process. Some factors, such as rate of decrease in signal strength, have an indirect impact on this process, by providing a basis for dynamic threshold adjustment. Some important factors are discussed below.

One of the factors for making a handoff decision may be based on comparing the difference between the signal strengths of new BTS and old BTS to a threshold (hysteresis) value. This value must be so chosen so as to avoid any unnecessary handoffs. Signal degradation may occur due to:

Rayleigh (short-term) fading is a statistical modeling technique suited for non-LoS environments. It assumes that signal power will fade according to a Rayleigh distribution. It is particularly suited to an urban environment, where large objects lead to scattering of radio signal.

Log-normal shadowing (long term), also called slow fading, is caused due to multi-path. It is prevalent in regions where large objects block line of sight. The variations in signal amplitude will follow a log normal distribution.

These two factors, in addition to path loss, are the biggest contributors to random fluctuations in signal level, leading to undesirable handoffs (ping-pong effect). Averaging the signal strength can substantially reduce the effect of Rayleigh fading. The choice of a threshold value thus depends upon the standard deviation of log-normal shadowing and the probability that the handset will perform a handoff.

Rate of AGC Change (RAC) will come into play when scanning commences i.e. when the IF AGC is activated. RAC will play an important role to dynamically adjust the thresholds and delay timeout values. The RAC may be calculated at intervals substantially higher than the super-frame rate. This is because there will not be a noticeable change in AGC in every super-frame. Note that the typical super-frame duration is about 30 ms. A high RAC implies that the handset is moving at high speed. Thus the window available for handoff is small and thresholds for acquiring timeslots and initiating handoff should be lower. For a given range of RAC values, there will be a corresponding set of threshold values. Thus a table exists that contains the mappings between RAC and thresholds.

While selecting a BTS to perform a handoff, the handset may use the available capacity at that BTS as a factor. A BTS, which does not have any available channels, should not be considered for handoff. Bit Error Rate is another factor that can be used to characterize the channel. A high BER may imply a higher level of interference, allowing the handset to seek an alternative BTS. Time since last handoff will play a role in avoiding unnecessary handoffs by controlling the frequency of handoffs performed by a handset.

Two distinct handoff techniques are disclosed in the preferred embodiment for the current xMAX system. The first, called Provisional Handoff Mechanism, is based on preemptively preparing for an approaching handoff. The second is based on inter BTS communication over the backhaul network. The two techniques are discussed in detail below.

A new mechanism, called Provisional Handoff Mechanism, is herein disclosed that does not require any inter-BTS communication. The mechanism makes use of proactive scanning to create a list of BTSs that have an acceptable RSSI (Received Signal Strength Indicator) value. Proactive scanning is a technique where a handset proactively monitors BTSs in its vicinity. In each scan, the mobile will collect RSSI values and store them in a cache.

Based on the measurements made during proactive scanning, the handset may make a decision regarding when to perform a handoff. It may then request timeslots from multiple BTSs (which are in reception range) while maintaining its current connection. The new BTSs will assign provisional Uplink and Downlink timeslots (if available) to the handset. The handset will monitor multiple thresholds each corresponding to a trigger. If the RSSI drops below a given threshold, a trigger will be generated. Based on the trigger, a specific sub process will execute.

The Provisional Handoff mechanism can be sub-divided into three distinct processes. Each process performs a specific function and can be represented by a combination of states. The State Transition Diagram for Provisional Handoff is depicted in FIG. 1 and the triggers are described below:

Trigger 1: "Approaching handoff" trigger. Generated by RSSI Monitoring Module (RMM) if RSSI drops below the first threshold.

Trigger 2: "Imminent handoff" trigger. Generated by RMM if second threshold is breached.

Trigger 3: "Initiate handoff" trigger. Generated by RMM if RSSI falls below final threshold.

Cancel Trigger: It can be generated by RMM at any point if RSSI is restored to an acceptable level.

Previous State Trigger: When generated, it will cause the state machine to move to previous state. It will be generated if the condition that led to the current state no longer exists.

The three sub modules of the handoff process are discussed below.

The RSSI Monitoring Module (RMM) shown in FIG. 2 obtains the Automatic Gain Control (AGC) value from the physical layer once every Superframe. The AGC is calculated by the AGC block based on the signal received from the BTS. A BTS will always transmit a beacon in each Superframe, regardless of any voice calls. Reception of this beacon allows the calculation of AGC. In the system of the preferred embodiment, AGC is implemented at two levels—Radio Frequency (RF) and Intermediate Frequency (IF). If RF AGC is enabled, it implies that the signal is sufficiently strong, thus no handoff would be necessary. However, if IF AGC is enabled, implying a weaker signal, the possibility of handoff cannot be ignored. In such a scenario, the AGC value will be made available to the RMM. The RMM maintains a weighted running average of incoming AGC values, and each new value is incorporated in the average. The average is calculated based on the following relationship:

$$f_{i+1} = \alpha(a_{i+1} + f_i)$$

where,
$f_{i+1}$—Current average
$\alpha$—scaling factor (<1)
$a_{i+1}$—Incoming AGC
$f_i$—Previous average The RMM controls three thresholds, each corresponding to a particular Trigger level. The first threshold is associated with Trigger 1 (Handoff Warning Trigger).

The enabling of IF stage AGC will be interpreted as Trigger 1 by the system and the handoff state machine will enter SCAN state. A counter corresponding to Trigger 1 will be incremented once every Superframe as long as IF AGC is enabled. If the counter value exceeds a predefined limit, transition to SCAN state will take pace. The purpose of the timer is to provide a delay between the reception of the trigger and the actual transition. This is needed to avoid spurious handoffs due to random signal strength variations. The state machine will also check if there is a possibility of inter-sector handoff (which will be decided during the scanning phase). If so, the values of different thresholds and counter limits will be modified accordingly.

The second threshold is associated with Trigger 2 (Handoff Imminent Trigger). If the average AGC drops below this threshold, and remains at that level till its corresponding counter has reached its upper limit, the state machine will make a transition to Provisional Timeslot state, where it will attempt to proactively acquire provisional timeslots from the prospective BTS.

The final threshold is associated with Trigger 3 (Initiate Handoff Trigger). As the average AGC crosses this threshold and remains below it for the predefined delay period, the state machine moves to the initiate handoff state. In this state, the handoff will be completed and the provisional timeslots will be assigned on a permanent basis. The handset will then inform the old BTS of its current status. If, at any point of time, the average AGC goes above the thresholds, the handoff process is terminated and all counters are reset to the original values.

Under normal operation, each handset will only listen to the Control Data Timeslot (CDT) of the BTS to which it is associated. However, if scan mode is initiated as shown in FIG. 3, the handset will turn its receiver on for the entire Hyperframe period in order to learn about other BTSs in the vicinity.

In the system of the preferred embodiment, scanning mode is initiated when IF AGC is enabled. If the AGC value remains stable for a given time period the scan interval will decrease exponentially, until it reaches a lower bound. This mechanism is required to avoid unnecessary scans, which leads to higher power consumption.

The handset will maintain a data structure for storing information collected during the scan. The information will include BTS ID, AGC value and any other information that the BTS may transmit for facilitating handoffs. The handset will also be required to determine if there is a possibility of inter-sector handoffs. To allow that, the BTS ID will be modified to include 4 bits of sector ID and 12 bits of BTS ID. If the BTS ID of the new BTS matches that of the current BTS, inter-sector handoff may take place. In such a scenario, all thresholds and timeout values will be adjusted, as the window available to perform an inter-sector handoff will be much smaller as compared to that for inter-cell handoff.

On receiving Trigger 2, the handoff state machine enters Provisional Timeslot Acquisition state as shown in FIG. 4. It will then select a suitable BTS from the neighbor table. The selection process will take into account various factors including average AGC, current load etc. It will then use the contention based (CBA) timeslots of the selected BTS to send a Provisional Timeslot Assignment request.

The handset will then listen to the CDT in the next Superframe to confirm if timeslots have been assigned. Since there is a finite probability of collision in CBA timeslots, the handset will retransmit the request if no assignments were made. If the assignment was successful, the handset will wait for Trigger 3. If no trigger is received for a given time period, the BTS will revoke the timeslot assignment. The handset will then have to re-send the request as needed.

If the trigger is received, the handset will use the provisional timeslots to send a Handoff Confirm message to the new BTS, allowing it to make the timeslot allocation permanent. It will then transfer the voice call to the new timeslots, and if still in contact with the old BTS, it will send a Connection Breakdown message, allowing the old BTS to release the timeslots. In case of inter cell or inter dealer handoff, the new BTS will also be responsible for assigning a new IP address. The message sequence timeline is shown in FIG. 5 with the method definitions and descriptions shown below.

Message Definitions:

| 1 | Approaching Handoff trigger | 2 | Provisional Handoff request |
|---|---|---|---|
| 3 | Provisional Handoff reply | 4 | Imminent Handoff trigger |
| 5 | Handoff Confirm | 6 | Handoff Confirm Ack |
| 7 | Connection break | | |

Message Descriptions:
Provisional handoff request: this message is sent by the handset to new BTSs selected from its cache. It will be sent in one of the dedicated handoff timeslots reserved for this purpose in the Superframes of each BTS.
Provisional Handoff reply: this message will be sent by the new BTSs in reply to the handoff request. The reply will include a provisional uplink timeslot, a provisional IP address (in case of Inter dealer handoff) and a BTS load parameter that indicates the resource availability on that BTS. Both the timeslot and the IP address are assigned on a temporary basis. If handoff is not completed within a given time period, the allocation will be revoked. This message will be sent in the CDT of the Superframe.
Handoff confirm: Once the handset makes a decision to handoff to a new BTS, it will send this message in the provisional uplink timeslot assigned to it.
Handoff confirm Ack: Sent by the new BTS in response to handoff confirm. Before sending this message, BTS will make timeslot and IP address allocation permanent. It will also assign a downlink timeslot to the handset. This message will be sent in the CDT as a Control Element.

In summary the handset will initiate a scan when IF AGC is activated. It will also begin estimating rate of change of AGC. Based on the estimated rate, the threshold values and timeout counters will be adjusted. If threshold 2 is breached, and the corresponding counter expires, handset will attempt to acquire provisional timeslots. Finally, if threshold 3 is breached, the handset will consider the capacity and BER values of the prospective BTS, before making a decision to perform a handoff. If two BTSs are available, it will choose the one with better parameters.

Handoff using Inter-BTS communication is a hand-off mechanism based on exchange of messages between the current and new BTS to set up the hand-off as shown in FIG. 6. Using these messages, the current BTS provides relevant information to the new BTS allowing it to prepare for the approaching handoff. The messages that are exchanged between the handset, current BTS and the new BTS are discussed below:

handoffIndicate: Sent by a mobile to the old BTS once it decides that a handoff is imminent. The message will include the ID of the new BTS to which the mobile wishes to join.

handoffRequest: Sent by the old BTS to the new BTS indicating imminent handoff. The message will include the MAC address of the mobile, allowing the new BTS to add it to its Hash table and allocate a timeslot if the mobile is in the middle of a voice call.

handoffResponse: Sent by new BTS to the old BTS in response to handoffRequest. It contains the result code, which can be 1 if the BTS is able to assign timeslot or 0 if timeslots were not available.

handoffConfirm: Sent by old BTS to the mobile. It may contain the result code: 1-SUCCESS or 0-FAILURE. On receiving this message the mobile will synchronize with the Superframe of the new BTS and obtain the timeslot information by listening to the CDT.

handoffNetworkJoin: Sent by the mobile to new BTS using the dedicated timeslots for handoff. This message is sent in the case when no voice call is in progress, and it allows the new BTS to add the MAC I.D. of the mobile to its Hash table.

handoffConnectionEstablish: If, during a voice call, the link between the mobile and old BTS breaks before the handoff message sequence is completed, the mobile will use the dedicated handoff timeslots in the Superframe of the new BTS to send this message. On receiving this message, the BTS will add the MAC ID to its Hash table, allocate a timeslot for the mobile and also send a handoffConfirm message to the old BTS, allowing it to free its timeslot.

At time instance T1, the mobile receives a handoff trigger from the RSSI monitoring module. It then initiates the Handoff Process. Ideally, the handoff message exchange should be completed before time instant T2. If the link breaks before that, the mobile sends a handoffNetworkJoin or handoffConnectionEstablish message in the Superframe of New BTS.

In hand-off between affiliated networks as shown in FIG. 7 the following are important terms:

Home BTS: It is the BTS with which the handset is currently associated.

Home MSC: The Mobile Switching Station (MSC) to which Home BTS is connected.

Foreign BTS: The BTS that belongs to a different subnet (different dealer or MSC).

Foreign MSC: The MSC to which the foreign BTS is connected.

A station, on receiving a handoff trigger, will send a Handoff request message to the Home BTS. The message will contain the BTS-ID of the Foreign BTS with which the station wishes to associate. BTS-ID will consist of a 16-bit MSC ID (or Dealer ID) and a 16-bit BTS ID. Each BTS will maintain a cache containing associations between BTS Ids and corresponding IP addresses for the BTSs in the same subnet i.e. connected to the same MSC. If the MSC ID is the same as that of the Home MSC to which BTS is connected, implying that the new BTS belongs to the same subnet, then the BTS will look up the IP address of the new BTS and follow the procedure described in the previous section.

If, however, the MSC ID is different, the request will be forwarded to the Home MSC. MSC-ID will allow the Home MSC to determine the Foreign MSC to which the Foreign BTS is connected. A public IP address will be allocated to each MSC, which will also maintain a table of IP addresses vs. MSC Ids. Each time the MSC receives a handoff request, it looks up the table to find the IP address corresponding to the MSC ID received in the request. It then sends the handoff request to the foreign MSC, which forwards it the Foreign BTS. The BTS, after allocating a timeslot for the station, sends a reply to the Foreign MSC. IP address allocation is handled either by the Foreign MSC or by the Foreign BTS. The Foreign MSC sends a confirmation to the Home MSC that contains the IP address allocated to the station. The confirmation is passed on to the station via the Home BTS.

In this patent application a provisional hand-off mechanism to support seamless mobility is presented. Whenever a handset anticipates a need to hand-off, it acquires provisional timeslots from the new base station. Based on user mobility or signal characteristics the handset might decide to convert provisional timeslots into permanent timeslots or relinquish provisional timeslots.

Since certain changes may be made in the above described provisional hand-off mechanism to transfer handsets between base stations for a MAC protocol for use in VoIP systems without departing from the scope of the invention herein involved. It is intended that all matter contained in the description thereof, or shown in the accompanying figures, shall be interpreted as illustrative and not in a limiting sense.

What is claimed is:

1. A provisional timeslot method for mobile node handset handoff between multiple base stations having a medium access control protocol used for forwarding Internet Protocol packets between multiple base stations and mobile nodes in voice over the Internet protocol systems on a wireless network comprising:

multiple base stations in electrical communication with the Internet;

one or more mobile nodes in wireless electrical communication with one of said multiple base stations;

said multiple base stations and said one or more mobile nodes each having a medium access control protocol;

each of said multiple base stations transmitting a beacon signal;

said medium access control protocol having superframes containing headers that contain provisional time slots dedicated to handing off a mobile node between a current base station a mobile node is in wireless electrical communication with and a replacement base station;

wherein when said mobile node detects a threshold minimum signal strength from said current base station said mobile node scans for received signal strength indicators from said beacons of other said multiple base stations in mobile nodes' electrical communication range and said mobile node stores said received signal strength indicators of said multiple base stations;

wherein when said mobile node detects an additional threshold minimum signal strength from said current base station it sends a provisional handoff request to a replacement base station that has the strongest stored received signal strength indicator;

wherein said replacement base station receiving said provisional handoff request assigns provisional time slots to said mobile node that sent said provisional handoff request to said replacement base station; and, wherein when said mobile node detects a final threshold minimum signal strength from said current base station it sends a handoff confirm message using said provisional time slots to said replacement base station beginning wireless electrical communication with said replacement base station and also sends a connection break-off message to said current base station breaking off wireless electrical communications with said current base station.

2. The provisional timeslot method for mobile node handset handoff between multiple base stations of claim 1 wherein when said mobile node detects a final threshold minimum signal strength from said current base station said mobile node sends a handoff indicate message having identification information of said replacement base station that has the strongest stored received signal strength indicator to said current base station and said current base station sends a handoff request message having a medium access control protocol address of said mobile node to said replacement base station allowing the establishment of wireless electrical communication between said mobile node and said replacement base station and the breaking off of wireless electrical communication between said mobile node and said current base station.

* * * * *